US011616838B2

(12) United States Patent
Schlichtner

(10) Patent No.: US 11,616,838 B2
(45) Date of Patent: Mar. 28, 2023

(54) SECURING AN AUTOMATION COMPONENT

(71) Applicant: SIEMENS AKTIENGESELLSCHAFT, Munich (DE)

(72) Inventor: Marc Schlichtner, Spardorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/045,479

(22) PCT Filed: Mar. 5, 2019

(86) PCT No.: PCT/EP2019/055421
§ 371 (c)(1),
(2) Date: Oct. 5, 2020

(87) PCT Pub. No.: WO2019/197080
PCT Pub. Date: Oct. 17, 2019

(65) Prior Publication Data
US 2021/0058460 A1 Feb. 25, 2021

(30) Foreign Application Priority Data

Apr. 9, 2018 (EP) .................................... 18166362

(51) Int. Cl.
G06F 15/16 (2006.01)
H04L 67/1097 (2022.01)
(Continued)

(52) U.S. Cl.
CPC .......... H04L 67/1097 (2013.01); G06F 3/067 (2013.01); H04L 9/0643 (2013.01); H04L 9/3239 (2013.01); H04L 9/50 (2022.05)

(58) Field of Classification Search
CPC . H04L 67/1097; H04L 9/0643; H04L 9/3239; H04L 2209/38; G06F 3/067
See application file for complete search history.

(56) References Cited

U.S. PATENT DOCUMENTS 8,458,301 B1* 6/2013 Andrus ............... H04L 41/0672
709/220
2005/0188351 A1* 8/2005 Hoefler .................... G06F 8/20
717/106
(Continued)

FOREIGN PATENT DOCUMENTS

CN 101682546 A 3/2010
CN 105612467 A 5/2016
(Continued)

OTHER PUBLICATIONS

European Search Report for European Application No. 18166362.6-1204 dated Sep. 25, 2018.
(Continued)

Primary Examiner — Razu A Miah
(74) Attorney, Agent, or Firm — Lempia Summerfield Katz LLC

(57) ABSTRACT

The invention relates to a method for securing component data assigned to an automation component (D1, D2, DN), wherein the component data is transmitted to at least one portion of computing nodes of a distributed registry (BN1, BN2, BN3), wherein the distributed registry (BN1, BN2, BN3) functions to authenticate the component data, preferably component data of multiple automation components (BN1, BN2, BN3).

19 Claims, 5 Drawing Sheets

(51) Int. Cl.
*G06F 3/06* (2006.01)
*H04L 9/06* (2006.01)
*H04L 9/32* (2006.01)
*H04L 9/00* (2022.01)

(56) References Cited

U.S. PATENT DOCUMENTS

| | | | |
|---|---|---|---|
| 2006/0218651 | A1 | 9/2006 | Ginter et al. |
| 2006/0248016 | A1* | 11/2006 | Ginter .................. H04N 21/835 705/54 |
| 2008/0279204 | A1* | 11/2008 | Pratt, Jr. ........... H04W 56/0015 370/406 |
| 2010/0082176 | A1* | 4/2010 | Chang ..................... H02J 3/14 700/295 |
| 2010/0217994 | A1* | 8/2010 | Ginter .................. G06T 1/0021 713/168 |
| 2011/0257766 | A1* | 10/2011 | Sundaram .......... G05B 19/4185 700/7 |
| 2013/0031211 | A1* | 1/2013 | Johnson ................ H04L 67/101 709/218 |
| 2013/0086244 | A1* | 4/2013 | Besold .................... H04L 67/12 709/223 |
| 2013/0132541 | A1* | 5/2013 | Falk ..................... G06F 15/177 709/222 |
| 2015/0229654 | A1* | 8/2015 | Perier .................... H04W 12/03 726/3 |
| 2016/0057046 | A1* | 2/2016 | Slupik .................... H04L 45/74 370/329 |
| 2016/0150263 | A1* | 5/2016 | Patino ................... H04N 7/173 725/25 |
| 2016/0217436 | A1* | 7/2016 | Brama .................. G06Q 20/10 |
| 2016/0246294 | A1* | 8/2016 | Girardey .......... G05B 19/41845 |
| 2016/0275461 | A1* | 9/2016 | Sprague ................ H04L 9/3234 |
| 2017/0214701 | A1* | 7/2017 | Hasan ................. H04L 63/1491 |
| 2017/0307387 | A1* | 10/2017 | Kohlhepp .............. G06Q 50/18 |
| 2018/0032573 | A1* | 2/2018 | Jarman ............... G06F 16/3331 |
| 2018/0183587 | A1* | 6/2018 | Won ........................ H04W 4/70 |
| 2018/0284749 | A1* | 10/2018 | Cella ................. G05B 23/0286 |
| 2019/0287200 | A1* | 9/2019 | Schuler ................ H04L 9/3239 |

FOREIGN PATENT DOCUMENTS

| | | |
|---|---|---|
| CN | 107203344 A | 9/2017 |
| EP | 3070554 A1 | 9/2016 |
| WO | 2017167399 A1 | 10/2017 |
| WO | 2018028766 A1 | 2/2018 |

OTHER PUBLICATIONS

International Search Report and the Written Opinion for International Patent Application PCT/EP2019/055421 dated Jun. 26, 2019.

* cited by examiner

SECURING AN AUTOMATION COMPONENT

This application is the National Stage of International Application No. PCT/EP2019/055421, filed Mar. 5, 2019, which claims the benefit of European Patent Application No. EP 18166362.6, filed Apr. 9, 2018. The entire contents of these documents are hereby incorporated herein by reference.

BACKGROUND

The present embodiments relate to securing an automation component.

Within an automation system, data is generally transferred into and out of many different automation components. These automation components may be, for example, programmable logic controllers, numerical controls, fieldbus components of the decentralized periphery, or even field devices. The data (e.g., identification information or parameterization data such as operating data permanently stored on the respective automation component) may generally be transmitted over a direct electrical connection (e.g., Profibus or Ethernet). Wireless transmission is also possible via W-LAN or other wireless industrial protocols such as WirelessHART, for example.

Today automation systems and/or automation components such as automation devices, applications, plants, for example, are identified via proprietary identification mechanisms (e.g., serial numbers) that are only tamperproof to a limited extent and are stored in different manufacturer-specific databases (e.g., in a central database and/or by software such as SIEMENS "Teamcenter"). The many automation systems and/or automation components also have no connection via communication networks in the sense of the IoT (Internet of Things), and the data is therefore generally not up-to-date but based on historical states. In addition, the data is very limited (e.g., nameplate), static, and/or may be "easily" manipulated.

One or more automation components may include one or more individual parts (e.g., one or more automation components). Applications may include one or more automation components, and one or more plants may include one or more automation components and applications.

Using the current solution of, for example, serial numbers, parts lists, and/or "as-built" information in proprietary and closed systems, no unified, comprehensive information may be obtained across manufacturers, supply chains, and business chains. Information for tracing automation components, for example, is difficult to find. Protection against falsification may no longer be guaranteed for a purchaser of the automation component if the purchaser does not have complete system transparency across the supply chain and the ability to access the data. In addition, small manufacturers may not afford anti-counterfeiting or tracking systems. Should small manufacturers be compelled by purchasers to provide this information, the small manufacturers are often faced with barely manageable costs. The basic technical problem is that today's systems are closed, often heterogeneous systems that do not allow comprehensive manufacturer- and system-independent collaboration and are also at the discretion of the individual parties.

In addition, the changes to one or more automation components from the manufacture of the smallest element to operation in the corresponding application are not stored in a traceable manner. Add to this the high costs of such a solution, both for the investment phase and for the operational phase. Some purchasers compel manufacturers to provide continuous documentation of the supply chain that, however, again ends up in proprietary systems and cannot be updated to reflect changes. There are also various certificate-based anti-counterfeiting solutions, but without any integration into an overarching system.

Manufacturers also use Internet of Things (IoT) or cloud-based solutions to close data gaps. However, this chain for acquiring data of an automation component does not start at the design and production stage of an automation component, but often only when the automation component is in operation. However, in the case of central solutions of this kind, a reliable and up-to-date dataset cannot be guaranteed or is only possible to a limited extent, and it is imperative that the fullest confidence be placed in the central instance.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an advantageous solution that overcomes the abovementioned disadvantages is provided.

A method for securing component data assigned to an automation component is provided. The component data is transferred to at least some computing nodes of a distributed registry, where the distributed registry is used to authenticate the component data (e.g., component data of a plurality of automation components).

As another example, an apparatus including at least one automation component, that is assigned component data is provided. The apparatus is configured to transfer component data to at least some computing nodes of a distributed registry, where the distributed registry is used to authenticate the component data (e.g., component data of a plurality of automation components).

Although the invention has been illustrated and described in detail by the exemplary embodiments, the invention is not limited by the examples disclosed, and other variations will be apparent to persons skilled in the art.

DETAILED DESCRIPTION

Figure 1:
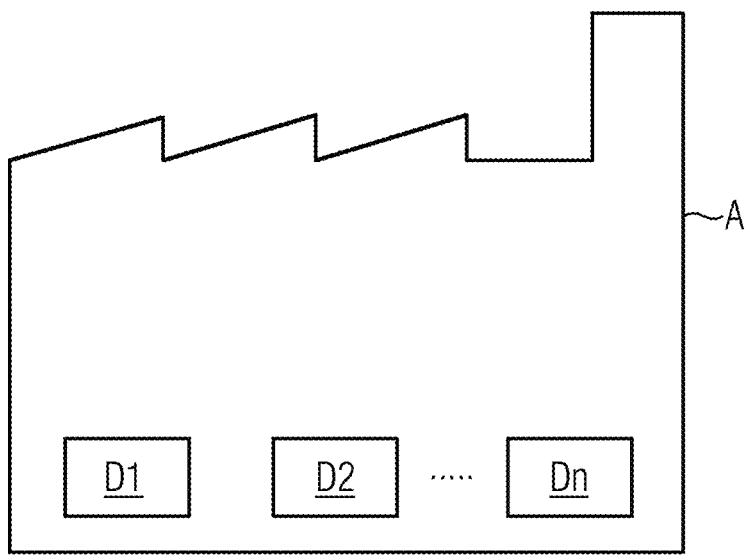
FIG. 1 schematically illustrates one embodiment of an industrial plant including a plurality of automation components.

FIG. 1 schematically illustrates an industrial plant A. The industrial plant A may typically include a plurality of automation components D1, D2, . . . , Dn that are used jointly or individually to carry out, for example, an automated process taking place in the plant A. An automation component D1 may be, for example, a sensor or an actuator. Using the automation component D1, an automation process may be carried out, or the automation component D1 may be used to carry out at least part of an automation process.

Data such as measured values or other status values may be communicated by one or more of the automation components D1, D2, ..., Dn. For this purpose, for example, an automation component D1 may have an appropriate communications interface (not shown) that is used to receive and/or transmit component data. The data coming from an automation component D1 may be received, for example, by an open- and/or closed-loop control unit that is used, for example, to control, in an open-and/or closed-loop manner, the process taking place in the plant. In addition or alternatively, the data may be transferred to a processor unit (e.g., a processor) that is used to monitor one or more automation components and/or the process taking place in the plant. For example, this may be a (software-based) solution for predictive maintenance.

In automation systems, as shown in FIG. 1, for example, components such as, for example, field devices that serve to acquire and/or influence process variables are often used. To acquire process variables, measuring devices (e.g., fill level meters, flowmeters, pressure and temperature measuring devices, pH measuring instruments, conductivity meters, etc. that measure the corresponding process variables of fill level, flow rate, pressure, temperature, pH-value, and conductivity, respectively) are, for example, used. To influence the process variables, actuators via which, for example, the flow rate of a liquid through a pipe or the fill level of a medium in a container may be varied may be used.

Figure 2:
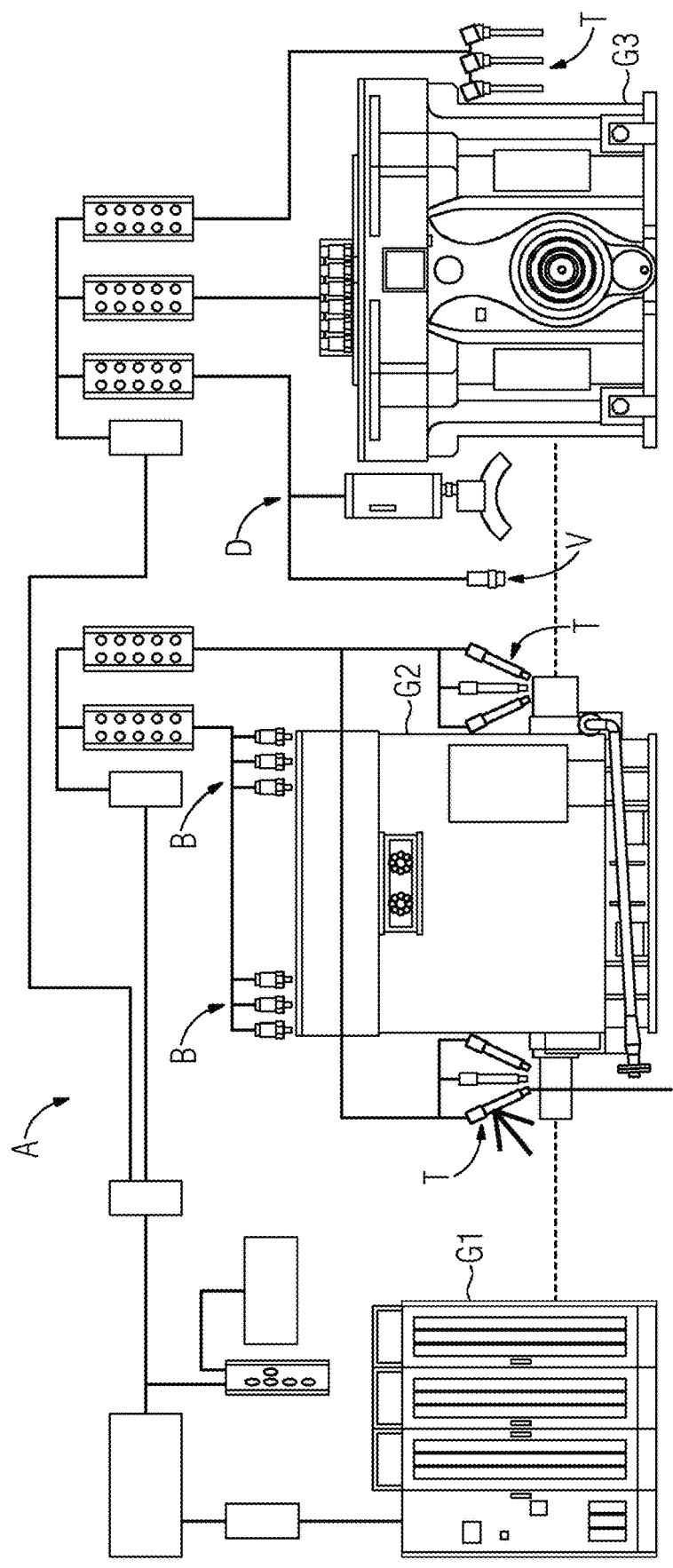
FIG. 2 schematically illustrates another embodiment of an automation system.
Figure 3:
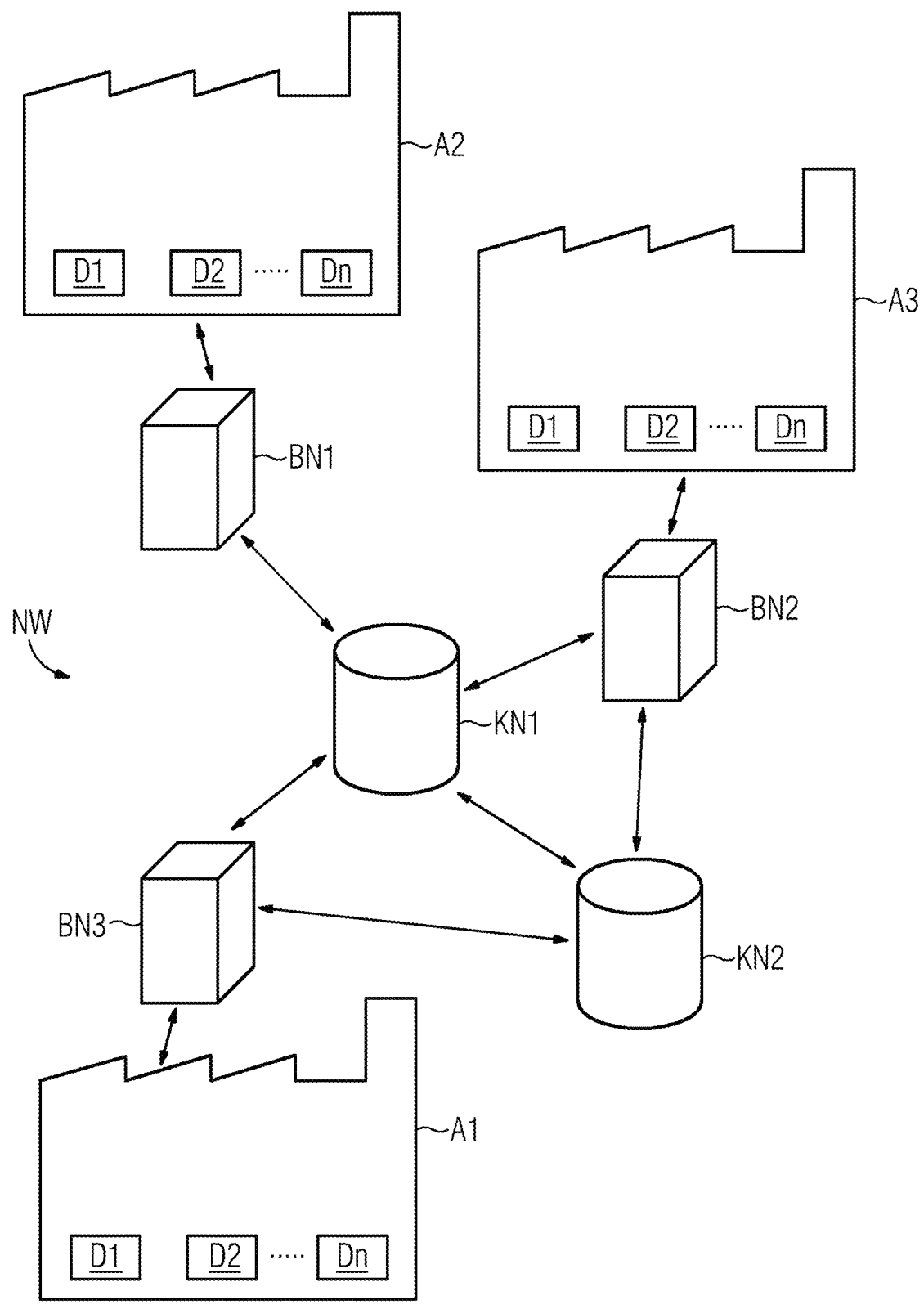
FIG. 3 schematically illustrates a plurality of automation systems and a network including a plurality of network nodes that constitute a distributed registry.

A further embodiment of an automation system is shown in FIG. 2. The plant shown there includes, as automation components, a controller G1, a motor G2, and a gearbox G3, where a plurality of sensors, such as, for example, temperature sensors T, acceleration sensors B, and torque sensors D, as well as a velocity sensor V are provided both on the motor G2 and on the gearbox G3.

As described above, the automation components may contain component data. To authenticate this component data, a distributed, digital, tamperproof, and distributed registry that may be continuously updated is provided. This may be implemented, for example, by a distributed database. The distributed registry may contain, for example, one or more digital twins of the automation components. The digital twin may be a data model of the automation component. A digital twin may be one or more code objects with parameters and dimensions of the parameters and dimensions of the physical twin. One or more digital twins may be used, for example, to provide manufacturers with dynamic, structured data relating to the operation of corresponding automation components (e.g., using complete product life-cycle data and/or simulation models). This enables designers, manufacturers, and maintenance service providers to interact with one another to provide better quality products and more effective maintenance outcomes. A digital twin may include identification data corresponding to a unique physical automation component, one or more simulation models, and a database.

For example, all the automation components and associated component data of a plant operator (e.g., of one of the plants shown in FIG. 1 or 2) may be stored in the distributed registry. This may be, for example, component data that is used to identify automation components in one or more plants. This component data is thus collected automatically. Component data may provide information for service engineers or other personnel. For example, the component data may be used to identify where particular automation components or systems are being operated incorrectly.

According to one embodiment, a plurality of automation components D1, D2, ... Dn may be connected, via a network, to different network nodes BN1, BN2, BN3 that constitute a distributed registry. There may be other nodes KN1, KN2 in the network that are not part of the distributed registry. Component data (e.g., in the form of data blocks) may be exchanged via the network NW. Component data modifications may then take place via transactions. One or more of the nodes BN1, BN2, BN3 may be used for storing the component data (e.g., in the form of the above mentioned data blocks). Transaction data may be created by an automation component D1 to Dn and/or by one of the nodes BN1, BN2, BN3. The transaction data of a plurality of automation components D1 to Dn in an automation system may be created centrally by higher-order nodes BN1, BN2, BN3. The transaction data may be generated (e.g., in the form of data blocks) when one or more items of component data are changed. For example, transaction data may be created when particular predefined component data such as, for example, parameter settings of one or more automation components is changed. For example, transaction data may always include identification information for identifying an automation component. This transaction data may be stored and read in a tag that, for example, contains a memory.

Individual automation components D1 to Dn or central computers of an automation system that are linked to the network NW may therefore transmit transaction data to one or more nodes BN1, BN2, BN3 of the distributed registry. Transaction data may, for example, include identification information (e.g., a machine ID "Siemens SiXY SN3175438"). In addition, the transaction data may include other component data of an automation component. The transaction data may be signed by a public key of an automation component and additionally encrypted by a private key of the automation component. Alternatively or in addition, a hash value may also be provided.

The network NW containing the distributed registry may be, for example, a peer-to-peer network. The distributed registry may consequently be based on a blockchain mechanism in which a proof of work is performed by one or more nodes BN1, BN2, BN3 of the network NW. The proof-of-work verification may be selected according to the available computing capacity of the network NW. Alternatively, a mechanism based on a proof-of-stake mechanism, for example, may be used. It is therefore possible to provide tampering protection for the distributed registry using different methods.

The distributed registry (e.g., for automation components, applications, and/or plants) may be based on a database system having integrity that is provided by cryptographic concatenation of the corresponding hash values (e.g., initial as well as changes) of the digital twin (e.g., chain). The distributed registry may be implemented using cloud-based software. In addition, component data may be implemented in a memory contained in or assigned to an automation component.

One or more automation components may be connected to the distributed registry via one or more networks. The component data may then be transmitted via the network. For example, an automation component may be permanently connected to the network in order to store changes in the distributed registry. This enables a continuously available and up-to-date digital twin of an automation component to be created. In addition, component data may also be stored locally (e.g., in above-mentioned tag).

The assignment of an automation component to component data that is used, for example, to identify the automation component may be implemented at a very early point in time (e.g., if possible, as early as the design stage of the automation component, at the latest as soon as the automation component leaves a factory). Every automation component leaving a production facility is therefore already part of the distributed registry and provided with tamperproof basic information. One or more automation components may therefore be, ex-works, part of a cryptographically protected and distributed registry. The initial population of the component data is therefore available to the distributed registry. This initial population may be information relating, for example, to a parts list, a software version, a serial number, a production date, a firmware version, a test report, one or more test reports.

By the distributed registry, an initial data block of the digital twin pertaining to the automation component (e.g., an associated unique hash value) may be determined, for example, automatically from component data. The hash value may be, for example, stored and filed in the distributed registry. In the event of component data changes, the changed component data as well as historical component data such as a previous hash value may, for example, be used as the basis for calculating the new hash value. This provides for the integrity of the historical data.

Figure 5:
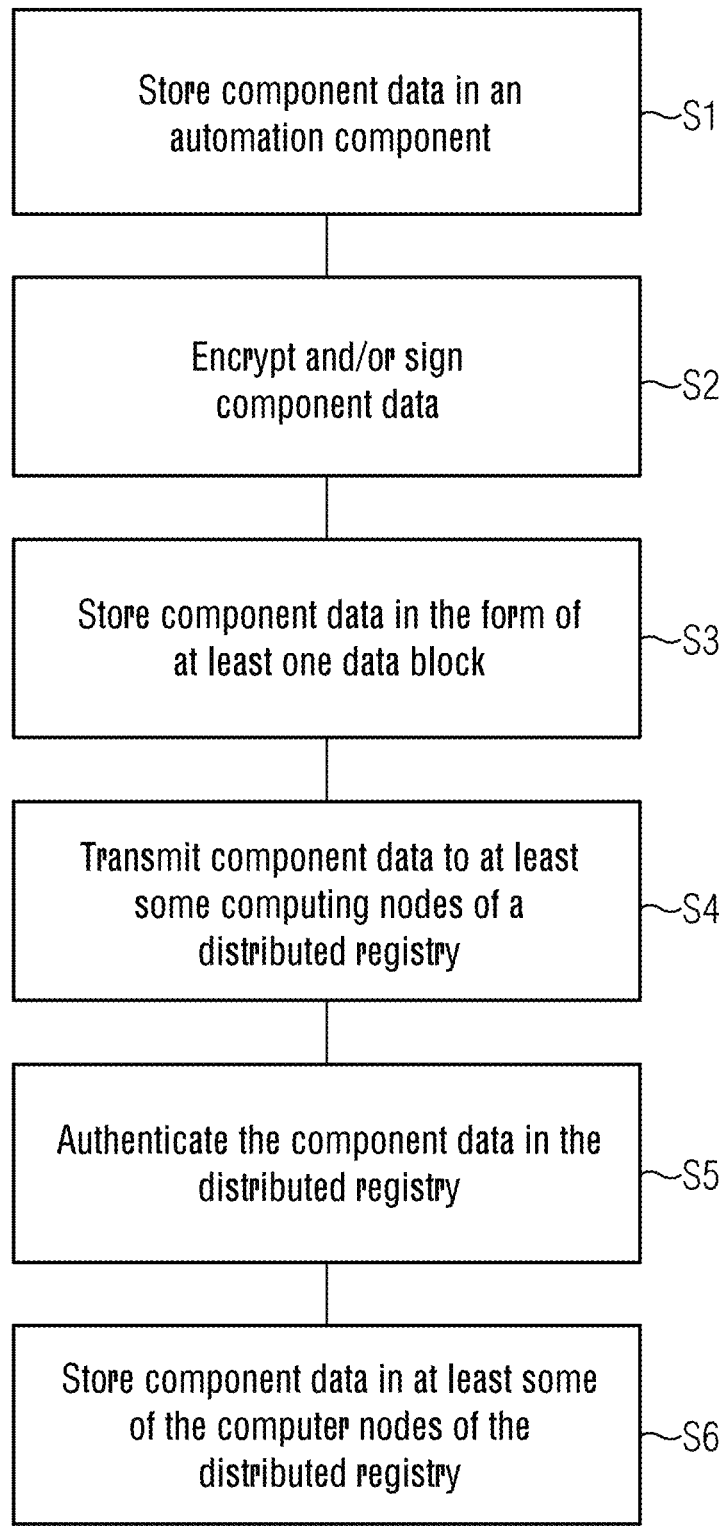
FIG. 5 shows an embodiment including a plurality of method acts.

One or more automation components D1 to Dn may be subscribers of the network NW. When the automation component is in operation, a connection to the network NW may be set up. This connection may be implemented either directly by networked automation components or by using an interface device to establish the connection, as shown in FIG. 5 (e.g., reader, mobile terminal devices, etc.). If the connection is broken, the component data changes taking place in the meantime or "real time" component data queries are transferred to the distributed registry as soon as a connection to the network NW is re-established.

Access to the distributed registry may be managed by a trustworthy instance (e.g., authority). Each operator of one or more automation components may, for example, provide computing capacity for operating the network.

The distributed registry may be managed by a trustworthy instance (e.g., authority). For example, for this purpose, a tag as well as the distributed registry is populated according to "as-built" and/or "as-operated" as early as the design phase of the automation component and later during production of the automation component. This enables a basic status of the tamperproof digital twin to be established. The tag offers an option of integration into the distributed registry ranging from read only tags, through read/write tags, to permanently online automation components.

The distributed registry may identify each of the automation components in an unambiguous and tamperproof manner via a consensus method (e.g., in that all the component data is generated as blocks and then appended to a blockchain and therefore present at all the nodes (all the subscribers of the network) and making changes traceable). The storing of the new data blocks (e.g., due to component data changes) builds upon itself and may not be modified subsequently without loss of integrity, as this modification would have to be made throughout the distributed registry. The computing capacity (e.g., for computing a new data block, for checking the transaction, and/or for carrying out a proof-of-work or proof-of-stake mechanism) may be provided by an industrial PC such as a programmable logic controller (PLC), or by an interface device (e.g., a so-called edge device). This prevents the component data from being tampered with.

The digital twin in the distributed registry may provide not only the "as-built" but also the "as-operated" information for the networked products in this network. The respective characteristics may be selected as a function of the available computing capacity of the network (e.g., of the nodes of the network), of the available storage (e.g., in the network and/or in the tag of the automation component), and/or of the size of the component data volume to be processed.

The registry is distributed, open, and therefore manufacturer-independent. As a result, all manufacturers, irrespective of size, may add or also interrogate component data. The cost of maintaining the system may therefore be spread over the network, so that no expensive operating costs necessarily accrue in company computer centers. Several users may therefore share infrastructure. The system also allows manufacturer-independent and tamperproof identification of component data. The component data includes not only static limited "as-built" information but may also include dynamic "as-operated" information. The openness of the system provides that component data may be expanded. The concatenation of component data changes may be cryptographically protected. In addition, a hardware tag for storing the component data, for example, may be provided on the automation component.

Component data changes may be protected by cryptographically protected concatenation of individual data blocks (e.g., blockchain technology). These blocks may be stored in the tag and/or called up therefrom. The distributed registry may be globally available and, for example, is not hosted by the manufacturer of one or more automation components but may be used as the basis for a global industry solution. The distributed registry enables users to unambiguously identify automation components. Other advantages are that counterfeit automation components, refurbished automation components, and/or modifications to automation components are traceable and available at all times. This enables the storage, provision of services, recalls, and/or phase-out planning to be optimized. Component data of an automation component "as-operated" is also available. In addition, information for the operation of the automation components in the field may be collected. This "as-operated" information may be used as the basis for predictive maintenance. All the information concerning modifications to the automation component may be acquired throughout the service life of the automation component. The creation of parts lists or even the whereabouts or the type of use of an automation component is therefore possible.

To store the component data, a read and/or write tag K may be mounted on the automation component, as shown in FIG. 5. This may be read out and/or written by an operator N having an appropriate operating device BG. For this purpose, for example, a connection to the network may be established by and via the operating device BG. For this purpose, a mobile communication or other wireless connection, for example, may be used. The reading and/or writing of component data from/to the automation component and/or to or from a tag K mounted thereon may likewise take place via a wireless connection.

Subsumed under the term automation component are all types of measuring devices and actuators. Also referred to as components are all the devices used in a process-related manner and that supply or process-relevant information. In addition to the aforementioned measuring devices/sensors and/or actuators, (e.g., components) are units that are directly connected to a bus, such as a fieldbus, for example, and are used for communication with a higher-order unit such as, for example, remote I/Os, gateways, linking devices and wireless adapters or radio adapters, programmable logic controllers (PLCs), etc.

Further exemplary embodiments are explained below with reference to FIG. 6. Accordingly, in act S1, component data may be stored in an automation component. As already described, this may take place ex works, and/or component data may be assigned to the automation component in the design phase of the automation component. For this purpose, a tag containing the automation data may be mounted on or in the automation component. The tag may be configured such that the component data stored therein is readable and/or writable. In addition, component data may be stored (e.g., modified) in, for example, the tag during operation of the automation component. The component data may be static data, such as, for example, manufacturer information, a serial number, and/or a parts list. The component data may also be semi-static data such as, for example, configuration parameters, location, and/or a firmware/software version of the automation component. The component data may be dynamic data such as, for example, measured values or status values.

The component data may also be data that relates to a digital twin of the automation component. The digital twin contains status data of the automation component. The status data relates to an as-designed, an as-planned, an as-built, an as-installed, an as-maintained, and/or an as-operated state of the automation component. As-built information may be used to describe or show the actual appearance, status, structure, or function of an automation component. For example, particular aspects of a manufacturing process may result in differences between the theoretical model, which describes the as-designed state, and the as-built state. These may be tolerances, variation in the manufacturing process structure, cold working, and/or environmental factors such as temperature and/or vibration. Over the lifecycle of an automation component, a manufacturer is to provide that the as-designed state meets the set requirements at all times and that the hardware and software actually supplied (e.g., as "as-built" state) corresponds to the agreed configuration. In addition, tools, devices, jigs, templates, test equipment, and/or software may also be added in order to support the acquisition, manufacture and/or development of an automation component and to plan availability to support production. When these aspects are stated on a manufacturing parts list, the result is a manufacturing bill of materials (MBOM), or an "as-planned" state. The data representing these states is of considerable diversity because the data includes: information about physical parameters, technical specifications, layouts, and device codes (e.g., in the specification); simulations, parts lists, documents and drawings (e.g., in the design); manufacturing processes and testing procedures and results (e.g., in production); installation and safety procedures; and documentation (e.g., in the installation); material composition, recycling methods; and/or data that relates to the respective state (e.g., as-installed, as-maintained, and/or as-operated). This classification is necessary because of the ever increasing complexity of the possible configurations (e.g., configuration management, CM) of automation components (e.g., considered over their lifetime) from development, through manufacture and servicing, to disposal, cf. ISO 10007.

In act S2, the component data may be encrypted or signed (e.g., using a key assigned to the automation component). As mentioned above, this may be done, for example, by generating transaction data.

In act S3, component data may be stored in the form of at least one data block.

The component data may be encrypted and/or signed when the component data is changed. For example, the component data may be stored in the form of a data block when the component data or at least part of the component data is changed. For example, a change (e.g., changes; every change to the component data; in the form of a data block) is transmitted to at least some of the computing nodes of the distributed registry and/or stored in at least some of the computing nodes of the distributed registry, and, for example, linked to at least one data block that represents component data present prior to the change.

In act S4, component data may consequently be transferred to at least some of the computing nodes of a distributed registry. A plurality of interconnected automation components and/or at least some of the connected automation components and/or one or more computing nodes may form the distributed registry. The component data may be component data of automation components of one or more manufacturers. In addition, at least some of the computing nodes constituting the distributed registry may be computing nodes that are operated and maintained by different manufacturers.

The component data in the distributed registry may be authenticated in act S5. It may be checked, for example, whether the component data received is consistent with a previous version of the component data and/or whether the component data is genuine.

Then (e.g., if authentication is successful), in act S6, component data may be stored in at least some of the computing nodes of the distributed registry. If authentication is unsuccessful, the component data transmitted to the distributed registry is discarded.

Changed component data, on the basis of which at least part of a hash-based algorithm such as, for example, proof of work or proof of stake has been executed by the component data, may then be transferred to the at least one automation component (e.g., to at least one computing node of the distributed registry) and/or stored in a computing node of the distributed registry. Changed component data may be accepted and/or stored by a computing node of the distributed registry if the component data fulfils at least part of a hash-based algorithm, such as, for example, proof of work or proof of stake.

Figure 4:
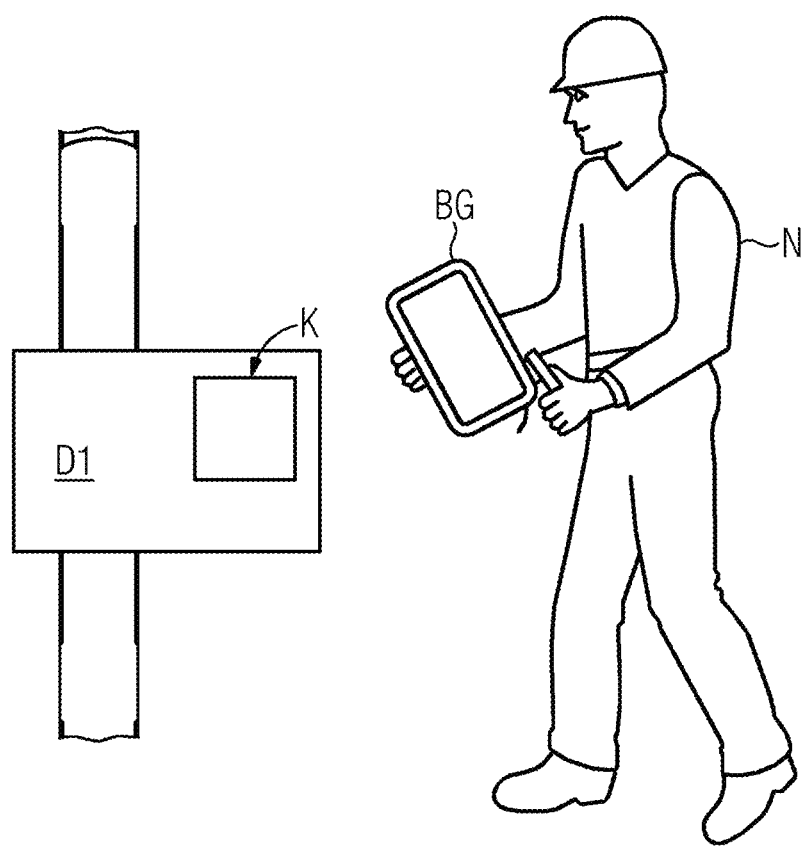
FIG. 4 schematically illustrates the writing and/or reading of component data of an automation component.

As described in conjunction with FIG. 4, the changed component data is transferred to at least some of the computing nodes of the distributed registry using an adapter attached to the automation component and/or by a hand-held operating device for reading out the component data. The component data or changed component data may also be stored in the automation component, and/or a tag attached to the automation component may be stored by an adapter attached to the automation component and/or by a hand-held operating device. Component data may basically be stored in all the nodes of the distributed registry. Corresponding copies of a blockchain may be stored in one or more tags. For example, information such as, for example, "as-operated" operating data may additionally be stored in a blockchain. If one wishes to ascertain, for example, that a component is an original component, only the identification information of the automation component is required for checking purposes. If one wishes to ascertain that, for example, no change has been made in an automation component either to the hardware and/or the software, more component data (e.g., in a transaction block) is to be acquired and/or appended to a blockchain. In addition, the entire blockchain or at least part of the blockchain may then be stored in the automation component or a tag attached thereto.

The basic function of a tag may therefore be to make the automation component unambiguously identifiable. If the automation component and/or a tag has sufficient computing capacity, the tag may also form one of the nodes of the network or rather of the distributed registry.

The sequence of one or more of the abovementioned method acts may be re-arranged, or the acts may take place simultaneously or together.

In addition, it is possible to provide a computer program or computer programs that may be run on an automation component or a computing node. The program has program code means that, when they are executed, are used to carry out one or more of the abovementioned method acts and, for example, interact such that the abovementioned method acts are carried out by one or more automation components and one or more computing nodes.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for securing component data assigned to an automation component, the method comprising:
   transmitting the component data to at least some computing nodes of a distributed registry; and
   authenticating the component data using the distributed registry, the authenticating comprising checking, by the distributed registry, whether the component data is consistent with a previous version of the component data,
   wherein the component data is a digital twin of the automation component, the digital twin containing status data of the automation component, the status data relating to an as-designed state, an as-planned state, an as-built state, or any combination thereof of the automation component, and an as-installed state, an as-maintained state, an as-operated state, or any combination thereof of the automation component.

2. The method of claim 1, further comprising storing the component data in at least some of the computing nodes of the distributed registry.

3. The method of claim 1, wherein the component data is initially stored in the automation component, is stored during operation of the automation component, or a combination thereof.

4. The method of claim 1, further comprising encrypting or signing the component data.

5. The method of claim 1, further comprising storing, transmitting, or storing and transmitting the component data in the form of at least one data block.

6. The method of claim 1, wherein:
   the component data is status data, a serial number, a parts list, or any combination thereof;
   the component data is semi-static data of the automation component;
   the component data is dynamic data; or
   any combination thereof.

7. The method of claim 1, further comprising:
   transmitting a change to at least some of the computing nodes of the distributed registry;
   storing the change in at least some of the computing nodes of the distributed registry and linking the change to at least one data block representing the component data present prior to the change; or
   a combination thereof.

8. The method of claim 1, further comprising transmitting a change of the component data of the automation component to all the computing nodes of the distributed registry.

9. The method of claim 1, wherein a plurality of automation components are interconnected, and at least some automation components of the plurality of interconnected automation components, one or more computing nodes, or a combination thereof constitutes the distributed registry.

10. The method of claim 1, further comprising storing component data of a plurality of automation components in the at least some computing nodes of the distributed registry, the plurality of automation components including the automation component.

11. The method of claim 1, further comprising transmitting, by the automation component, changed component data to at least one computing node of the distributed registry storing the changed component data in a computing node of the distributed registry, or a combination thereof when at least part of a hash-based algorithm has been carried out by the component data.

12. The method of claim 1, further comprising accepting, storing, or accepting and storing changed component data by a computing node of the distributed registry when the component data fulfils at least part of a hash-based algorithm.

13. The method of claim 11, wherein the changed component data is transmitted to at least some of the computing nodes of the distributed registry by an adapter attached to the automation component, by a hand-held operating device for reading the component data, or a combination thereof.

14. The method of claim 1, further comprising storing the component data in a storage element attached to the automation component.

15. The method of claim 1, wherein authenticating the component data comprises authenticating component data of a plurality of automation components.

16. The method of claim 3, wherein the component data is changed during operation of the automation component.

17. The method of claim 4, wherein the component data is encrypted or signed using a key assigned to the automation component.

18. The method of claim 10, wherein the component data is component data of automation components of one or more manufacturers.

19. An apparatus comprising:
   at least one automation component, component data being assigned to the at least one automation component;
   a memory configured to store the component data; and
   a processor configured to:
      transmit the component data to at least some computing nodes of a distributed registry; and authenticate the component data using the distributed registry, the authentication comprising a check of whether the component data is consistent with a previous version of the component data,
wherein the component data is a digital twin of the at least one automation component, the digital twin containing status data of the at least one automation component, the status data relating to an as-designed state, an as-planned state, an as-built state, or any combination thereof of the at least one automation component, and an as-installed state, an as-maintained state, an as-operated state, or any combination thereof of the at least one automation component.

\* \* \* \* \*